United States Patent
Saurel et al.

(10) Patent No.: US 6,911,086 B2
(45) Date of Patent: Jun. 28, 2005

(54) DEVICE FOR COATING OPTICAL FIBERS

(75) Inventors: Eric Saurel, Lens (FR); Eric Jurdeczka, Lens (FR)

(73) Assignee: Alcatel, Paris (FR)

(*) Notice: Subject to any disclaimer, the term of this patent is extended or adjusted under 35 U.S.C. 154(b) by 225 days.

(21) Appl. No.: 09/863,315

(22) Filed: May 24, 2001

(65) Prior Publication Data
US 2001/0050043 A1 Dec. 13, 2001

(30) Foreign Application Priority Data
May 30, 2000 (FR) .......................... 00 06933

(51) Int. Cl.[7] .............................. B05C 11/02
(52) U.S. Cl. ......................... 118/125; 118/420
(58) Field of Search ..................... 118/410, 420, 118/125; 65/529; 425/113, 192 R, 191; 427/163.2, 169

(56) References Cited

U.S. PATENT DOCUMENTS

| | | |
|---|---|---|
| 4,374,161 A | 2/1983 | Geyling et al. |
| 4,531,959 A | 7/1985 | Kar et al. |
| 5,316,583 A * | 5/1994 | Milliman |
| 5,997,942 A | 12/1999 | Chang et al. |
| 6,030,664 A * | 2/2000 | DiMarcello et al. |
| 6,077,062 A * | 6/2000 | Guillemette et al. |
| 6,428,622 B1 * | 8/2002 | Maurin |

FOREIGN PATENT DOCUMENTS

| | | |
|---|---|---|
| EP | 0 021 677 A1 | 1/1981 |
| WO | WO 84/0127 | 3/1984 |
| WO | WO 00/05608 | 2/2000 |

* cited by examiner

*Primary Examiner*—Brenda A. Lamb
(74) *Attorney, Agent, or Firm*—Sughrue Mion, PLLC

(57) ABSTRACT

The optical fiber coating device includes a die-support into which is integrated in one piece a grid, the die-support accommodating an entry die and an exit die with the entry die on one side of the grid and the exit die on the other side of the grid. The outside diameter of the die-support on each side of the grid is greater than the outside diameter of the grid, so as to define a chamber which has a large volume when the coating device is placed in its support.

19 Claims, 1 Drawing Sheet

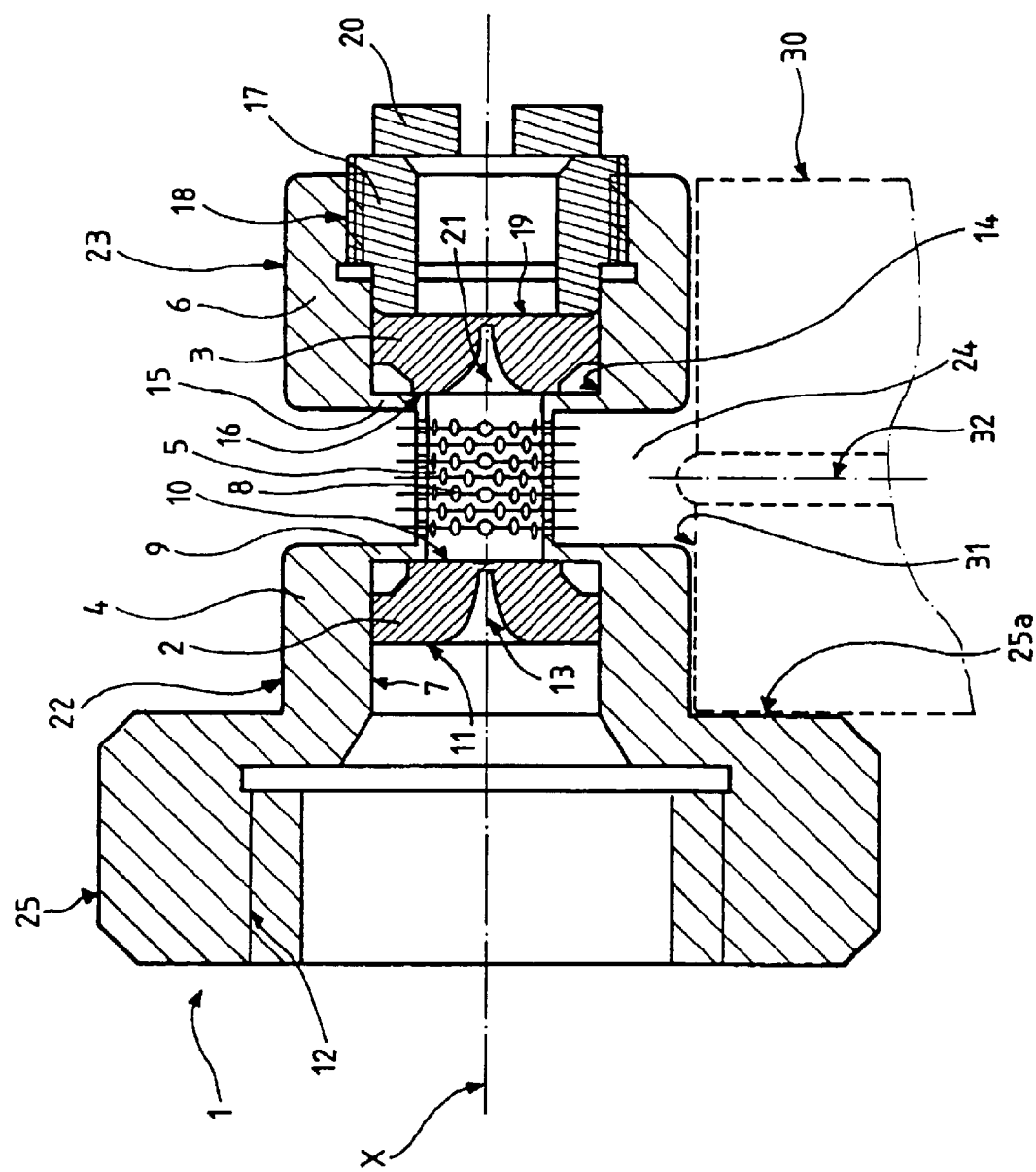

DEVICE FOR COATING OPTICAL FIBERS

The present invention relates to an optical fiber coating device, in particular a device for applying to an optical fiber a coating concentric with the fiber. The invention also relates to an installation using the device and a die-support which can be used to form this kind of device.

BACKGROUND OF THE INVENTION

The process of manufacturing an optical fiber conventionally includes fabricating a preform and then drawing the preform into a fiber. The fiber-drawing operation, i.e. the transformation of the preform into a fiber, is conventionally effected by drawing without contact, which entails melting the end of the preform in an induction furnace filled with an inert gas. The diameter of the fiber is measured at the exit from the furnace and the measured diameter is used to control the drawing speed in order to maintain the diameter of the fiber constant. The fiber-drawing speed can be in excess of 15 meters per second (m/s).

During the fiber-drawing operation it is typical for the fiber downstream of the furnace outlet to be coated immediately with a primary coating, which is generally a resin that is polymerized by ultraviolet light. The coating serves in particular to protect the fiber against chemical attack and mechanical abrasion during subsequent handling, to absorb stresses, to prevent the propagation of cracks, and to absorb cladding modes by virtue of its slightly higher index. Epoxy acrylate or polyimide resins are typically used. Sometimes a more rigid secondary coating is applied to the fiber after applying the primary coating.

Optical fiber coating devices have been developed which prevent the optical fiber touching any solid surface before or during the coating operation, which is imperative.

Document U.S. Pat. No. 4,531,959 proposes a coating device of the above kind in the form of an injector for applying a coating to an optical fiber which limits the quantity of air bubbles trapped in the coating applied in this way. The injector includes a jacket of circular section having a stepped bore concentrically housing a guide die, a cylindrical grid, and an exit die. The guide die has a tapered axial orifice, reducing in size inwards from the outside toward the grid. The exit die has a tapered axial orifice, reducing in size outwards from the grid toward the outside. Between them, the jacket and the grid form a chamber which is connected to the periphery of the jacket by a plurality of radial passages. To form this chamber, the grid comprises a flange at each end to provide a locating surface within the jacket. The injector is placed in a support enabling it to be positioned relative to the optical fiber to be coated downstream of the fiber-drawing furnace. The support also feeds resin under pressure to the radial orifices of the jacket and thence into the chamber, where it passes through the grid. The optical fiber passes through the injector, which it enters via the orifice of the guide die, enters the grid, and leaves via the exit die. As it passes through the grid, the optical fiber is coated with resin to form a coating whose outside diameter is determined by the smallest diameter of the exit die.

The above injector cannot assure a sufficiently accurate concentric relationship between the resin coating applied to the fiber and the fiber itself because of the tolerance between the stepped bore of the jacket, on the one hand, and the dies and the grid on the other hand. Because of these tolerances, these components can take up a slightly skewed or eccentric position, instead of being aligned concentrically. Also, there is no seal between the stepped bore, on the one hand, and the grid and each of the dies, on the other hand, and the resin under pressure can therefore escape from the chamber to the outside by passing between the stepped bore and the locating flanges of the grid and then between the stepped bore and the dies. It is possible to fit seals, for example O-rings, between the stepped bore and the flanges of the grid and/or the dies. However, such seals worsen any defective positioning of the dies and/or the grid and the resulting defective concentric relationship between the coating and the fiber.

OBJECTS AND SUMMARY OF THE INVENTION

An object of the present invention is to eliminate the drawbacks of the prior art, and in particular to solve the new problem of the concentric relationship encountered in the document U.S. Pat. No. 4,531,959.

To this end, the invention proposes a device for apply a coating to an optical fiber, the device including:
a die-support,
a grid for applying the coating to the optical fiber, the grid being made in one piece with the die-support, and
an entry die and an exit die disposed in the die-support on respective opposite sides of the grid and defining a passage for the optical fiber.

In one preferred embodiment the entry die is disposed in a housing of the die-support whose diameter is greater than the inside diameter of the grid.

In one preferred embodiment a radial face of the entry die is pressed against a first radial wall of the die-support. A hollow part screwed into the die-support preferably presses the entry die against the first radial wall.

In a further preferred embodiment the exit die is disposed in a housing of the die-support whose diameter is greater than the inside diameter of the grid. A radial face of the exit die preferably bears against a second radial wall of the die-support. A hollow part screwed into the die-support can advantageously press the exit die against the second radial wall.

In a further preferred embodiment the outside diameter of the die-support on each side of the grid is greater than the outside diameter of the grid. It is preferable if $D>\sqrt{(d_i^2+d_o^2)}$ where D is the outside diameter of the die-support on each side of the grid, $d_i$ is the inside diameter of the grid and do is the outside diameter of the grid. It is more advantageous if $D>2\sqrt{(d_i^2+d_o^2)}$ where D is the outside diameter of the die-support on each side of the grid, $d_i$ is the inside diameter of the grid and $d_o$ is the outside diameter of the grid.

Another aspect of the invention proposes an installation for applying a coating to an optical fiber, including a support in which is disposed a device of the type previously described, the support including means for feeding coating liquid around the grid. A chamber is preferably defined around the grid and connected to the coating liquid feed means, in which the chamber has a volume greater than the inside volume of the grid. The coating liquid feed means can advantageously include a plurality of passages discharging radially into the chamber.

A further aspect of the invention proposes a die-support including a cylindrical grid of circular inside section made in one piece with the die-support and a receiver on each side of the grid to receive a respective die. The outside diameter of the die-support on respective opposite sides of the grid is preferably greater than the outside diameter of the grid. It is preferable if $D>\sqrt{(d_i^2+d_o^2)}$ where D is the outside diameter of the die-support on each side of the grid, $d_i$ is the inside diameter of the grid and $d_o$ is the outside diameter of the grid. It is advantageous if $D>2\sqrt{(d_i^2+d_o^2)}$ where D is the outside diameter of the die-support on each side of the grid, $d_i$ is the inside diameter of the grid and $d_o$ is the outside diameter of the grid.

The invention has the advantage that optimum positioning of the dies relative to the grid integrated into the injector ensures an accurate concentric relationship between the resin coating and the optical fiber, which also eliminates the sealing problems of the prior art. The concentric relationship between the coating and the fiber is further improved by the large volume of resin surrounding the grid. Another object of the invention is to eliminate the wall of the prior art injector which defines an intermediate area inside the injector through which the resin passes from the injection table toward the grid. This reduces head losses in the injected resin and makes the temperature of the resin in the injector more uniform. Finally, the invention reduces the number of components constituting the injector, which achieves a significant reduction in cost.

BRIEF DESCRIPTION OF THE DRAWING

Other features and advantages of the invention will become apparent after reading the following description of one preferred embodiment of the invention, which description is given by way of example and with reference to the accompanying drawing.

The single FIGURE of the accompanying drawing is a diagrammatic longitudinal sectional view of a device in accordance with the invention for applying a coating to an optical fiber, referred to hereinafter as an "injector".

MORE DETAILED DESCRIPTION

The terms "upstream" and "downstream" as used herein relate to the direction of movement of the optical fiber through the injector.

The main components of the injector shown in the FIGURE are a die-support 1, an entry die 2 and an exit die 3. The die-support 1 is circularly symmetrical about its longitudinal axis X. The die-support 1 has an upstream end part 4, an intermediate part forming a grid 5 and a downstream end part 6. These three parts are made in one piece and are disposed successively along the longitudinal axis X.

The upstream end part 4 includes a circular section bore 7 concentric with the axis X. The bore 7 is followed in the longitudinal direction by the grid 5. The grid 5 is defined by a circularly cylindrical wall concentric with the axis 6 and whose surface is pierced by a plurality of radial holes 8. The diameter of the bore 7 is greater than the inside diameter of the grid 5. Consequently, the upstream end part 4 is connected to the upstream end of the grid 5 by a radial wall 9. The radial wall 9 delimits the bore 7 longitudinally at the downstream end. What is more, the outside part 22 of the upstream end part 4 has a diameter significantly greater than the outside diameter of the grid 5, at least in the area adjacent the grid 5.

The entry die 2 has a circular outside section and is placed in the bore 7, in which it is preferably a tight fit. The entry die 2 has on its downstream side a radial face 10 which abuts against the radial face 9 of the upstream end part 4. The entry die 2 is preferably held in position by a component, not shown, which resembles a hollow screw and which cooperates with a thread 12 in the upstream end part 4 at the upstream end of the bore 7. The screw presses on the upstream face 11 of the entry die 2, which is therefore pressed against the radial wall 9. The hollow screw can be similar to the hollow screw 7 holding the exit die 3 in position, which is described in more detail later.

The entry die 2 has an orifice 13 through it concentric with the axis X. Placing the entry die 2 in the bore 7 aligns the orifice 13 with the axis X. The orifice 13 is tapered, reducing in size in the upstream to downstream direction.

The downstream end part 6 is similar to the upstream end part 4. It includes a circular section bore 14 concentric with the axis X. The bore 14 is preceded in the longitudinal direction by the grid 5. The diameter of the bore 14 is greater than the inside diameter of the grid 5. The downstream end part 6 is therefore connected to the downstream end of the grid 5 by a radial wall 15. The radial part 15 delimits the bore 14 longitudinally at the upstream end. The diameter of the bore 14 is preferably equal to the diameter of the bore 7. Also, the outside part 23 of the downstream end part 6 has a diameter significantly greater than the outside diameter of the grid 5 and preferably equal to the diameter of the outside part 22 of the downstream end part 4.

The exit die 3 has a circular outside section and is placed in the bore 14, in which it is preferably a tight fit. The exit die 3 has on the upstream side a radial face 16 which abuts against the radial wall 15 of the downstream end part 3. The exit die 3 is preferably held in position by a hollow screw 17 which cooperates with a thread 18 in the downstream end part 6, downstream of the bore 14.

The hollow screw 17 has a radial surface bearing on the downstream face 19 of the exit die 3, which is therefore pressed against the radial wall 15. The hollow screw 17 has a hollow operating square 20 or the like at the end and projecting longitudinally out of the die-support 1 to enable it to be tightened or loosened using a wrench. The screw 17 is hollow and defines an unrestricted passage for the optical fiber along the longitudinal axis X.

The exit die 3 has an orifice 21 through it concentric with the axis X. Placing the exit die 3 in the bore 14 aligns the orifice 21 with the axis X. The orifice 21 is tapered, reducing in size in the upstream to downstream direction.

The injector shown in the figure is placed in a support 30 which feeds the injector with coating liquid to be applied to the optical fiber. The support 30 is of a conventional type known in the art. Part of the support 30, on one side of the longitudinal axis X, is shown in dashed outline in the FIGURE. The support 30 has a housing 31 through it in which are inserted the outside parts 22 and 23 of the upstream and downstream end parts 4 and 6 of the die-support 1. Sealing means, for example O-rings, are disposed between the housing 31 and the respective outside parts 22 and 23 to prevent coating liquid leaking out. In the example shown in the figure, the outside part 22 of the die-support 1 also has an upstream part 25 whose diameter is larger than that of the remainder of the outside part 22 and which is connected thereto by a radial surface 25a. The radial surface 25a advantageously abuts against an outside surface of the support 30. The support 30 incorporates one or more passages 32 for feeding coating liquid to the grid 5. The passages 32 discharge radially into the housing 31 between the radial walls 9 and 15 of the injector. The support 30 incorporates a plurality of passages 32, advantageously at least four such passages, equi-angularly spaced around the housing 31 to feed coating liquid uniformly around the grid 5.

The support 30 equipped with the injector is between the outlet of the drawing furnace and optical fiber traction means.

The coating installation in accordance with the invention operates in the conventional way. The optical fiber obtained at the outlet from the drawing furnace passes through the injector, entering it via the upstream end part 4, i.e. via the hollow screw, not shown, screwed into the thread 12, and then passing through the orifice 13 in the entry die 2. From there, the optical fiber enters and passes through the grid 5, and then passes through the downstream end part 6, entering and passing through first the orifice 21 of the exit die 3 and then the hollow center of the screw 17. In this way the optical fiber passes through the injector along its longitudinal axis X.

The conventional coating liquid, generally a resin, is fed under pressure via the passage or passages 32 of the support 30 into the annular chamber 24 defined between the radial walls 9 and 15, on the one hand, and between the grid 5 and the wall of the housing 31, on the other hand. The coating liquid in the chamber 24 then passes through the holes 8 in the grid 5 and is sprayed radially onto the optical fiber.

The minimum diameter of the tapered orifice 21 of the exit die 3 determines the diameter of the coating applied to the optical fiber. The minimum diameter of the tapered orifice 21 is determined in a manner known in the art by considering various parameters such as the diameter of the optical fiber, the thickness of the coating and the type of coating liquid employed.

The orifice 13 of the entry die 2 conventionally has a minimum diameter greater than the minimum diameter of the orifice 21 of the exit die 3. The orifice 13 facilitates initial insertion of the optical fiber into the injector, in particular by centering it so that it passes through the grid 5 and then the orifice 21 of the exit die 3. The minimum diameter of the orifice 13 is sufficiently large to prevent the optical fiber coming into contact with its wall during drawing and coating the optical fiber.

The shape and dimensions of the orifices 13 and 21 are defined in a manner that is known in the art.

Likewise the dimensions (length, outside diameter, wall thickness, etc.) of the grid 5 and the characteristics of the holes 8 (total number of holes, number of holes per row, number of rows of holes, relative disposition of the holes, hole diameter, etc.) are defined in a manner that is known in the art.

The support 30 generally incorporates means for positioning the injector correctly relative to the optical fiber, i.e. for aligning the longitudinal axis X of the injector with the axis of the optical fiber, so that the fiber passes through the orifices 13 and 21 of the dies 2 and 3.

The coating installation further includes means known in the art such as a coating liquid storage tank, feed tubes connecting the tank to the support 30, means for controlling the pressure of the coating liquid as a function of the speed of the optical fiber, and means for maintaining the coating liquid at the correct temperature. The pressure at which the coating liquid is injected is determined and controlled in a manner known in the art.

Downstream of the support 30, the optical fiber coated with the coating liquid generally passes through means for drying or hardening the coating liquid suited to the type of coating liquid used, usually a source of ultraviolet light.

The injector according to the invention achieves an accurate concentric relationship between the coating applied to the fiber and the fiber itself, thanks to reliable positioning of the dies and the grid. Reliable positioning of the grid 5 is obviously achieved by virtue of the fact that it is integrated into the die-support 1. This eliminates the effects encountered in the prior art of manufacturing tolerances and defects affecting the position of the grid inside the die-support. The concentric relationship of the entry die 2, the exit die 3 and the grid 5 is obtained by the fit with which the entry die 2 and the exit die 3 are positioned in their respective bores 7 and 14. Machining the bores 7 and 14 is facilitated by the fact that it can be carried out from the corresponding end of the die-support 1 and because their diameters are greater than the inside diameter of the grid 5.

The injector according to the invention also achieves an accurate concentric relationship between the coating applied to the fiber and the fiber itself because of the uniform distribution and pressure of the flow of coating liquid injected around the optical fiber through the grid 5. The diameter difference between the grid 5, on the one hand, and the outside parts 22 and 23 of the upstream end part 4 and the downstream end part 5 of the die-support 1, on the other hand, defines a large volume for the chamber 24, in contrast to the chamber surrounding the grid in the prior art injectors, which has a significantly smaller volume because the chamber is delimited externally by the inside wall of the die-support, and not by the wall of the support in which the injector is placed. It has been found that increasing the volume of the chamber significantly reduces the speed of the resin in the chamber, as a corollary of which the coating liquid injected via the grid 5 is replaced smoothly and uniformly throughout the chamber. The coating liquid is therefore injected through the holes 8 of the grid 5 with a uniform pressure around the optical fiber, which is held centered on the longitudinal axis X. Accordingly, the coating applied to the optical fiber, whose diameter is determined by the exit die 3, which is also on the axis X, is perfectly concentric with the optical fiber itself. It is advantageous for the chamber 24 to have a volume greater than the inside volume of the grid 5. In the embodiment described, this means that the diameter of the outside parts 22 and 23 is greater than the square root of the sum of the inside diameter squared and the outside diameter squared of the grid (5), in other words:

$$D > \sqrt{(d_i^2 + d_o^2)}$$

where:

D=diameter of outside parts 22 and 23,
$D_i$=inside diameter of grid (5), and
$D_o$=outside diameter of grid (5).

In one preferred embodiment the diameter of the outside parts 22 and 23 is more than twice the square root of the sum of the inside diameter squared and the outside diameter squared of the grid (5), in other words:

$$D > 2\sqrt{(d_i^2 + d_o^2)}$$

The dimensions can be D=23 mm, $d_i$=6.6 mm and $d_o$=8.6 mm, for example.

The grid 5 generally has a length in the range from 7 to 15 mm, for example.

Finally, the injector according to the invention provides a seal between the die-support 1 and the entry die 2 because of the pressure applied by the radial face 10 of the entry die 2 to the radial wall 9 of the upstream end part 4 because of the action of the hollow clamping screw, not shown, cooperating with the thread 12. Similarly, the seal between the die-support 1 and the exit die 3 is provided by the pressure applied by the radial face 16 of the exit die 3 to the radial wall 15 of the downstream end part 6 because of the action of the hollow screw 17.

The die-support 1 is preferably machined from stainless steel. One advantage of stainless steel is that there is no diffusion of particles into the coating liquid. In particular, the die-support can be made from 316 Ti stainless steel. The entry die 2 and the exit die 3 are preferably machined from tungsten carbide.

The injector according to the invention can be used to apply either the primary coating or the secondary coating to the optical fiber. It can be used for any type of optical fiber, for example silica optical fibers, plastics material optical fibers, fluorinated glass optical fibers, etc.

Of course, the present invention is not limited to the examples and the embodiment described and shown, and lends itself to many variants that will suggest themselves to the skilled person.

What is claimed is:

1. A device for applying a coating to an optical fiber, the device including:
    a die support;
    a grid for applying the coating to the optical fiber, the grid being an integral one-piece construction with the die-support; and
    an entry die and an exit die disposed in the die-support on respective opposite sides of the grid and defining a passage for the optical fiber; and
    wherein a radial face of the entry die is pressed against a first radial wall of the die-support and wherein the radial face of the entry die and the first radial wall are transverse to an axial direction of the entry die extending between the entry die and the exit die.

2. The device of claim 1, wherein the entry die is disposed in a housing of the die-support whose diameter is greater than the inside diameter of the grid.

3. The device of claim 1, wherein a hollow part screwed into the die-support presses the entry die against the first radial wall.

4. The device of claim 1, wherein the exit die is disposed in a housing of the die-support whose diameter is greater than the inside diameter of the grid.

5. The device of claim 4, wherein a radial face of the exit die bears against a second radial wall of the die-support, and wherein the radial face of the exit die and the second radial wall are transverse to an axial direction of the exit die extending between the entry die and the exit die.

6. The device of claim 5, wherein a hollow part screwed into the die-support presses the exit die against the second radial wall.

7. The device of claim 6, wherein the outside diameter of the die-support on each side of the grid is greater than the outside diameter of the grid.

8. The device of claim 7, wherein $D>\sqrt{(d_i^2+d_o^2)}$ where D is the outside diameter of the die-support on each side of the grid, $d_i$ is the inside diameter of the grid and $d_o$ is the outside diameter of the grid.

9. The device of claim 7, wherein $D>2\sqrt{(d_i^2+d_o^2)}$ where D is the outside diameter of the die-support on each side of the grid, $d_i$ is the inside diameter of the grid and $d_o$ is the outside diameter of the grid.

10. An installation for applying a coating to an optical fiber, comprising:
    a device that applies a coating to an optical fiber, the device comprising:
    a die support;
    a grid that applies the coating to the optical fiber, the grid being an integral one-piece construction with the die-support; and
    an entry die and an exit die disposed in the die-support on respective opposite sides of the grid and defining a passage for the optical fiber; and
    a support for the device, the support comprising means for feeding the coating liquid around the grid; and
    wherein a chamber is defined around the grid and is connected to the coating liquid feed means, in which the chamber has a volume greater than the inside volume of the grid.

11. The installation of claim 10, wherein the coating liquid feed means include a plurality of passages discharging radially into the chamber.

12. A die-support including a cylindrical grid of circular inside section and a receiver on each side of the grid in which is received a respective entry die and exit die, wherein the cylindrical grid and the receivers form an integral one-piece construction; and wherein the grid has through-holes that open into a common annular space surrounding the grid; and
    wherein the outside diameter of the die-support on respective opposite sides of the grid is greater than the outside diameter of the grid; and
    wherein $D>\sqrt{(d_i^2+d_o^2)}$ where D is the outside diameter of the die-support on each side of the grid, $d_i$ is the inside diameter of the grid and $d_o$ is the outside diameter of the grid.

13. A die-support including a cylindrical grid of circular inside section and a receiver on each side of the grid in which is received a respective entry die and exit die, wherein the cylindrical grid and the receivers form an integral one-piece construction; and wherein the grid has through-holes that open into a common annular space surrounding the grid; and
    wherein the outside diameter of the die-support on respective opposite sides of the grid is greater than the outside diameter of the grid; and
    wherein $D>2\sqrt{(d_i^2+d_o^2)}$ where D is the outside diameter of the die-support on each side of the grid, $d_i$ is the inside diameter of the grid and $d_o$ is the outside diameter of the grid.

14. An optical fiber coating apparatus, comprising:
    a die support having a longitudinal axis defining a path for passing an optical fiber through the die support so as to coat the optical fiber with a coating, the die support comprising:
    a grid for applying the coating to the optical fiber;
    an upstream part defining an upstream receiving portion, the upstream part having an outer diameter greater than an outer diameter of the grid;
    a downstream part defining a downstream receiving portion, the downstream part having an outer diameter greater than the outer diameter of the grid; and
    an entry die having a through-hole and disposed in the upstream receiving portion; and
    an exit die having a through-hole and disposed in the downstream receiving portion; and
    wherein the grid, the upstream part, and the downstream part are made from the same piece of material as an integral one-piece construction; and
    wherein a radial face of the entry die is pressed against a first radial wall of the upstream part of the die-support, and wherein the radial face of the entry die and the first radial wall are transverse to an axial direction of the entry die extending between the entry die and the exit die.

15. The optical fiber coating apparatus according to claim 14, wherein the downstream part includes a second radial wall, and wherein the first radial wall opposes the second radial wall to define an annular space around the grid.

16. The optical fiber coating apparatus according to claim 15, wherein the grid has a wall defining an interior of the grid and through-holes in the wall that open into the annular space and communicate the annular space with the interior of the grid.

17. The optical fiber coating apparatus according to claim 15, wherein one end of the grid is continuous with the upstream part to define the first radial wall, and the other end of the grid is continuous with the downstream part to define the second radial wall; and wherein a side of the first radial wall facing away from the grid abuts against the entry die, and a side of the second radial wall facing away from the grid abuts against the exit die.

18. The optical fiber coating apparatus according to claim 15, wherein the following relationship is met:

$$D > \sqrt{(d_i^2 + d_o^2)},$$

where D is the outside diameter of the upstream part and the downstream part, $d_i$ is the inside diameter of the grid and $d_o$ is the outside diameter of the grid.

19. The optical fiber coating apparatus according to claim 15, wherein the following relationship is met:

$$D > 2\sqrt{(d_i^2 + d_o^2)},$$

where D is the outside diameter of the upstream part and the downstream part, $d_i$ is the inside diameter of the grid and $d_o$ is the outside diameter of the grid.

* * * * *